US006553375B1

(12) United States Patent
Huang et al.

(10) Patent No.: US 6,553,375 B1
(45) Date of Patent: Apr. 22, 2003

(54) METHOD AND APPARATUS FOR SERVER BASED HANDHELD APPLICATION AND DATABASE MANAGEMENT

(75) Inventors: Yun-Wu Huang, Mount Kisco, NY (US); Robert D. Johnson, Ridgefield, CT (US); Roger A. Pollak, Pleasantville, NY (US); John J. Ponzo, Crompond, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/199,353

(22) Filed: Nov. 25, 1998

(51) Int. Cl.[7] .......................... G06F 17/00; G06F 17/30
(52) U.S. Cl. ..................... 707/10; 707/203; 707/204; 707/2
(58) Field of Search .................. 707/10, 1, 2, 203, 707/204; 709/201, 202, 203, 217

(56) References Cited

U.S. PATENT DOCUMENTS

| | | | | |
|---|---|---|---|---|
| 5,337,044 A | * | 8/1994 | Folger et al. | 340/825.44 |
| 5,377,259 A | * | 12/1994 | Butler et al. | 379/93.25 |
| 5,627,967 A | * | 5/1997 | Dauerer et al. | 713/202 |
| 5,729,682 A | * | 3/1998 | Marquis et al. | 709/229 |
| 5,752,042 A | | 5/1998 | Cole et al. | 717/11 |
| 5,758,355 A | * | 5/1998 | Buchanan | 707/201 |
| 5,828,833 A | * | 10/1998 | Belville et al. | 713/201 |
| 5,845,282 A | * | 12/1998 | Alley et al. | 707/10 |
| 5,848,064 A | * | 12/1998 | Cowan | 370/338 |
| 5,862,321 A | * | 1/1999 | Lamming et al. | 395/200.3 |
| 5,897,635 A | * | 4/1999 | Torres et al. | 707/10 |
| 5,948,066 A | * | 9/1999 | Whalen et al. | 709/229 |
| 5,991,810 A | * | 11/1999 | Shapiro et al. | 709/229 |
| 5,999,947 A | * | 12/1999 | Zollinger et al. | 707/203 |
| 6,076,105 A | * | 6/2000 | Wolff et al. | 709/223 |
| 6,122,741 A | * | 9/2000 | Patterson et al. | 713/200 |
| 6,163,844 A | * | 12/2000 | Duncan et al. | 713/201 |
| 6,182,142 B1 | * | 1/2001 | Win et al. | 709/229 |
| 6,202,207 B1 | * | 3/2001 | Donohue | 717/11 |
| 6,233,341 B1 | * | 5/2001 | Riggins | 380/277 |
| 6,460,141 B1 | * | 10/2002 | Olden | 713/201 |

FOREIGN PATENT DOCUMENTS

| | | |
|---|---|---|
| DE | 297 02 272 U1 | 7/1997 |
| EP | 0 841 615 A2 | 5/1998 |
| GB | 2 325 766 A | 12/1998 |
| GB | 2 346 716 A | 8/2000 |
| JP | 2-14325 | 1/1990 |
| JP | 8-106393 | 4/1996 |
| JP | A8-314789 | 11/1996 |
| JP | 9-54734 | 2/1997 |
| JP | 9-91212 | 4/1997 |
| JP | 9-260924 | 10/1997 |
| JP | 9-305408 | 11/1997 |
| JP | 10-177473 | 6/1998 |
| WO | Wo 97/15008 | 4/1997 |

OTHER PUBLICATIONS

Woo et al "Designing a Distributed Authorizaton Service", IEEE 1998, pages 419–429.*

* cited by examiner

Primary Examiner—Safet Metjahic
Assistant Examiner—Uyen Le
(74) Attorney, Agent, or Firm—Scully, Scott, Murphy & Presser; Douglas W. Cameron, Esq.

(57) ABSTRACT

The present invention is a novel management system for selectively distributing applications and databases from a server computer to a plurality of intermittently connected handheld devices. The applications and databases to be downloaded and deleted are first selected from an application list maintained by handheld devices. After established a connection with the server computer, the application list of selected applications is copied to the server computer which maintains an access control list indicating which applications are permitted to be downloaded to which handheld devices. The server computer examines the application list and the access control list to determine which applications are both selected and are authorized for use by the handheld device. After determining that requested applications are authorized for requesting devices, these applications are downloaded. If the connected handheld device does not have that the application list, the application list is created for it and downloaded.

20 Claims, 7 Drawing Sheets

METHOD AND APPARATUS FOR SERVER BASED HANDHELD APPLICATION AND DATABASE MANAGEMENT

BACKGROUND OF THE INVENTION

1. Field of the Invention

The present invention relates generally to the management of the distribution of applications and databases between electronic devices and more specifically, to a novel management system for selectively distributing applications and databases from a computer to a plurality of intermittently connected handheld devices.

2. Description of Prior Art

With the rapid advancement of semiconductor, storage, and display technologies, handheld or mobile devices have become increasingly popular. The handheld devices, such as a Palm Pilot, a Windows CE, a Zaurus, a Psion, a smart phone, or an intelligent pager have become very versatile. A handheld device may be used as a Personal Digital Assistant (PDA) providing such functions as e-mail, address book, calendar. Internet freeware, such as games, may be downloaded to the handheld device for leisure use. Business related applications and databases may be installed to improve productivity.

In an organizational setting, such as a corporation, an important issue in managing handheld devices is the distribution control of the applications to be installed in the handheld devices. For example, a corporation may develop several different sets of automated work procedures for handheld devices: customer account management procedures for the sales department; machine operation procedures for factories; and inventory control procedures for warehouses.

It may be valuable that the sales department devices receive only the account management application, the factory devices receive only the machine operation applications, and the warehouse devices receive only the inventory control applications. It may also be useful that, based on employee roles, devices belonging to different employees receive different sets of applications, matched to the employees' respective roles. A manager's device, for example, may get an employee evaluation tool which is not distributed to an employee's device. Furthermore, an organization may provide an additional set of applications, such as utility software, games, and other information databases. At the user's discretion, a subset of these applications may be chosen for download to each handheld device.

Handheld devices install applications through the synchronization process which is typically performed between the device and a PC. First, the application must be accessible by the PC which, through its serial port, is connected to the target handheld device. The PC software may be executed to load the target application into an "install" directory accessible by the synchronization manager software. The synchronization process is initiated by pushing a handheld device button, such as the HotSync button in Palm Pilot. Immediately after the button is pushed, synchronization manager software, such as the HotSync Manager used with Palm Pilot's, in the PC takes over the synchronization process during which the applications loaded in the "install" directory are downloaded and installed into the handheld device.

This software distribution process is a standalone system synchronizing software between a PC and a handheld device, it does not have centralized software distribution management functions. To distribute an application among many handheld devices, the application must first be copied to the PCS of all the target handheld device owners. After that, it is up to each owner to conduct the synchronization process to install this application from the PC in to the handheld device. Hence, there is no efficient way to determine which handheld devices have the target application installed.

An alternative way of distributing handheld applications within an organization, is to have a centralized server that manages a user pool, a handheld device pool, and an application pool. To install an application, a handheld device must first connect to the network and make such a request directly to the centralized server. It is the server's responsibility to authenticate the handheld device and its user, to authorize the application installation request based on the user profile, the device usage, and a pre-configured access-control policy. If the application installation request is authorized, the server downloads the target applications to the device.

The centralized server may update the application status of the handheld device, e.g., what applications have been installed in this device?, update the handheld device status associated with the target application that are managed by the centralized server, e.g., what devices have downloaded this application?, and log this download activity in the server's event logs. The event logs and the application status recorded by the server may provide important information in managing software distribution.

The traditional client-server model assumes a persistent network connection which exists for both the clients and the server. Therefore, the client requests and the corresponding services performed by the server are more interactive. Every time a client decides to examine the applications managed by the server that are available, the client may connect to the server, retrieve an updated list of available applications, choose the desired applications while the client is still connected to the server, and proceed to download the selected applications from the server. The client has no need to keep the list of applications and the status of these applications. The list of applications available to the client may be retrieved, and the status of each application on the client device determined during the interactive real-time query exchange between the client and the server.

The drawback of the traditional client-server model, however, is that the network connection of the handheld devices is not persistent. Only occasionally do handheld devices connect to the network, and typically the connection, through a low-bandwidth medium such as a modem or a serial cable, lasts a short time. It may be advantageous for each handheld client to maintain a list of applications that are available from the server.

Maintaining a list of applications may be accomplished in the following ways. The user of a handheld device may run software to perform application selection based on the application list while the device is not connected to the network. Therefore, no time-costly interactive application selection process occurs when the client is connected to the server.

Alternatively, while the device is disconnected, it may investigate and record the status of each application in the application list. This way, when the client is connected to the server, all information about the application status is already available. The server does not have to interactively query client for the status of each application, thereby further improves the efficiency of bandwidth and time usage when the client remains connected.

Many handheld devices have built-in support of a synchronization function which compares the two records with the same ID respectively from the device and a synchronization host and, based on an application dependent set of rules, determines if a record from one side override that of the other side or if other actions, such as replicate both records to the other side with a new ID should be taken.

The retrieval of the application list from the client by the server may directly use the synchronization function provided by these handheld devices.

SUMMARY OF THE INVENTION

In accordance with the aforementioned needs, the present invention is directed to a method and apparatus of a server-based handheld application management system. In this system, the server manages a pool of users, a pool of handheld devices, a pool of handheld applications, and a set of access-control policies governing which handheld devices owned by what users are authorized to download a subset of the applications.

In the present invention, the clients are handheld devices that are only occasionally connected to the server for distribution of applications. When they are connected, typically the connection lasts a short period of time and is through a low-bandwidth medium such as a modem or a serial line. The process of a client requesting for application download and the server servicing this request must be performed while the requesting clients remain connected to the network.

According to the present invention, an application list structure is provided to record the status of all applications available to a client, that are managed by the server. The status for an application may indicate if this application is installed in a client and if it is selected to be installed to this client next time this client connects to the server.

When a client connects to the server, a method is provided for the server to retrieve the application list from this client and to download a subset of applications in the list to the client, based on the status of each application in the list as well as the up-to-date access-control policy, and to update the application list in the client based on the up-to-date access-control policy.

Accordingly, the client updates its application list by allowing the user to select the applications to be downloaded the next time this client synchronizes with the server and by allowing the user to delete the applications that are installed in this client. This activity may be performed at any time, regardless whether the client is or is not connected to the network.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 1:
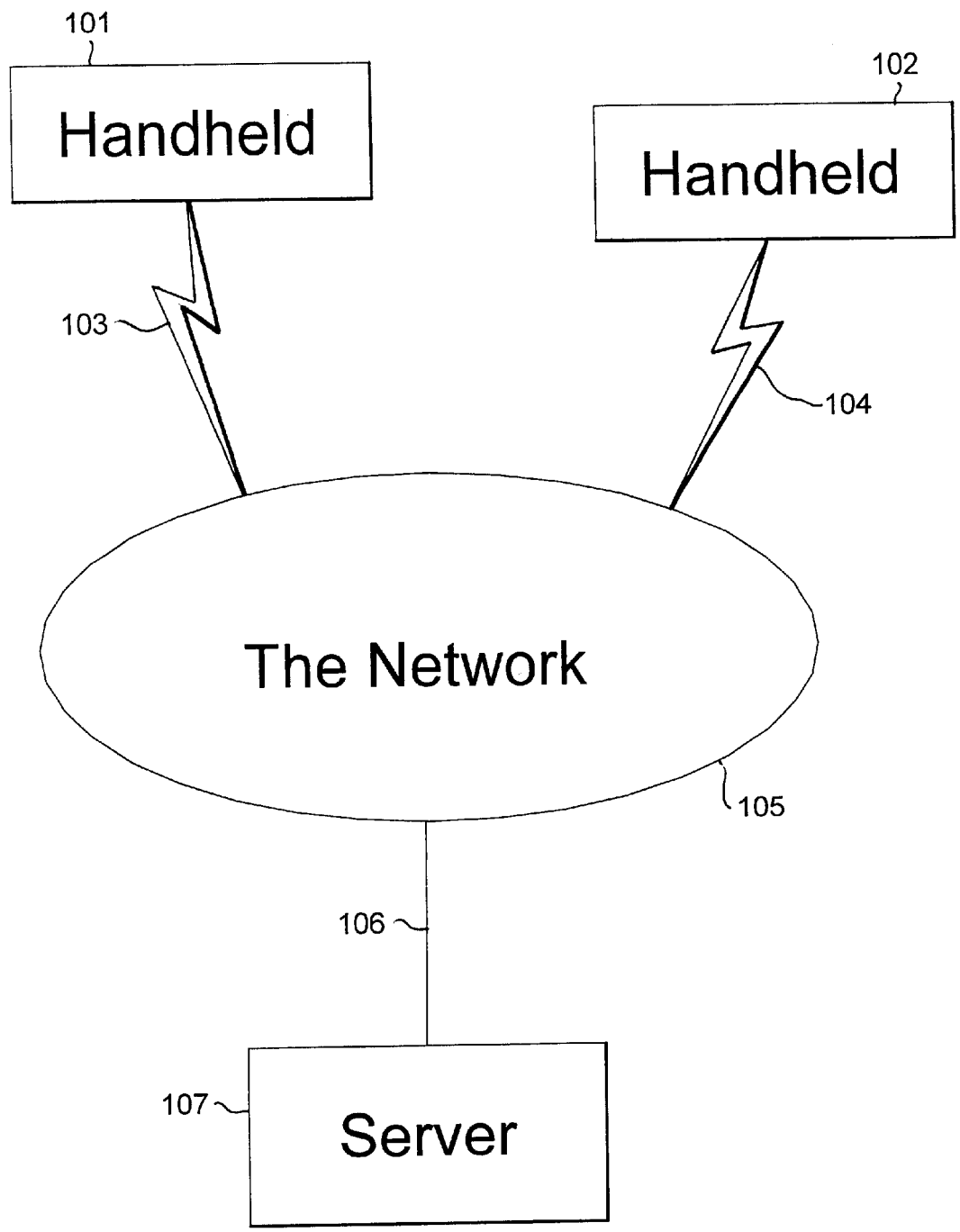
FIG. 1 is a diagram of the server based handheld application management system of the present invention.

FIG. 1 shows an example of an overall network architecture of the server based handheld application management system of the present invention. A client 101, 102, which is a handheld device and a server 107, which may be a PC, a workstation, a mainframe, or any other type of a device able to store and to upload information, are connected to the network 105 through connections 103, 104 and 106. Although the server 107 may or may not be connected to the network 105 The clients 101, 102 are more likely to be disconnected from the network 105 most of the time. However, while their application download requests are serviced by the server clients 101, 102 must remain connected to the network 105.

The process of a client requesting application download and the server servicing this request is performed while the requesting client remains connected to the network. A handheld device can obtain a connection to a network, such as the Internet or a local area network, by dialing up to a network remote access server through a modem, or by having a direct serial-port connection, e.g., the Palm Pilot cradle, to a network connected intermediary computer. In the former case, the client synchronizes with the server directly; in the latter case, the client synchronizes with the server through an intermediate computer which passes along the information transmitted back and forth between the client and the server.

Figure 2:
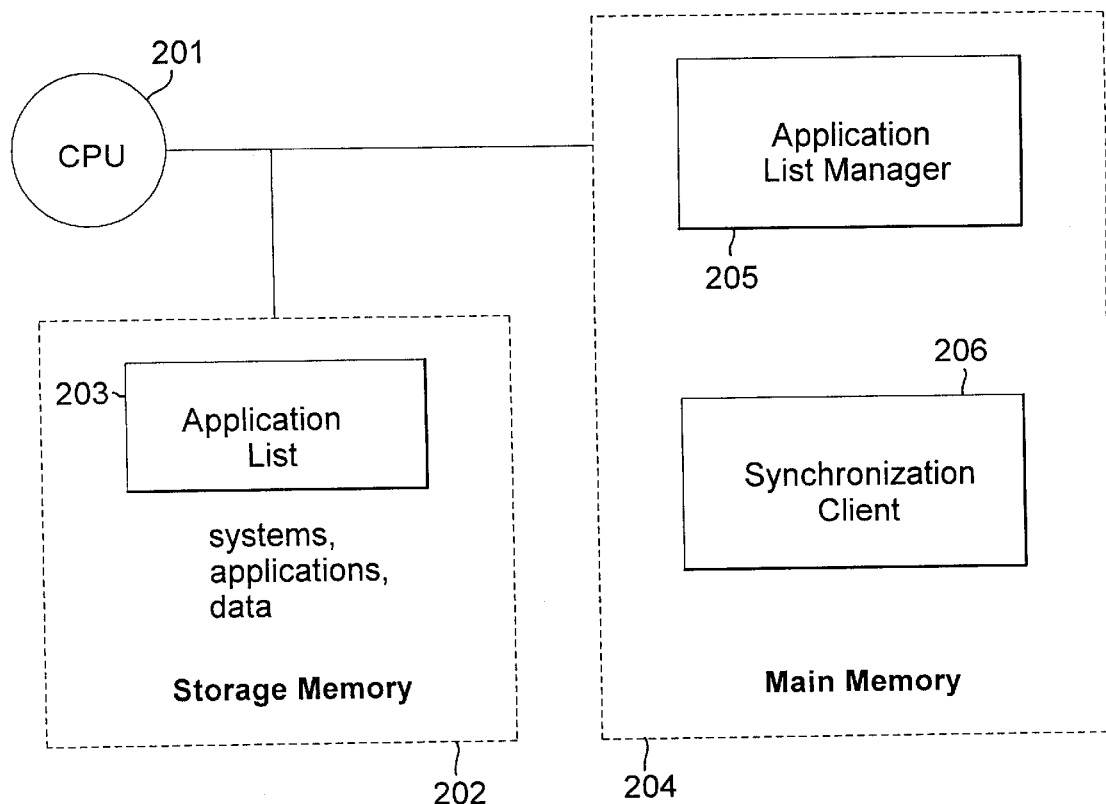
FIG. 2 is a diagram of a handheld features of the present invention.

FIG. 2 shows an example of an overall architecture of a handheld device capable of performing updates of the application list based on the method of the present invention. It includes a CPU 201, main memory 204, such as volatile RAM, and storage memory 202, such as nonvolatile RAM, ROM or disk. In general, the main memory 204 stores programs to be executed and the storage memory 202 stores systems, e.g., operating systems, applications not currently being executed, as well as the data, such as the contents of the address book or memo pad applications. The distinction between the main memory 204 and the storage memory 202 may not exist for some handheld devices. Those devices may store all information in RAM and ROM without any disks and execute programs directly from where the programs are stored.

In the present invention, an application list structure 203 is stored in the storage memory 202. The logic or the executable program code for updating and managing this application list 203 is the application list manager 205. The synchronization client 206 is the client function used when a handheld device starts synchronization with a synchronization host. In the present invention, the synchronization host may be the server PC, workstation, mainframe, etc.

Many handheld devices have built-in support for a synchronization client, such as the HotSync Manager client in Palm Pilot. The main tasks of a synchronization client include: receiving a synchronization API request from the synchronization host, e.g., read, write, update, or insert a record; executing the corresponding system function within the device; receiving an application from the synchronization host; and installing it on the handheld device. The synchronization client is used in the present invention to synchronize the application list from the client to the server and to install applications from the server to the client.

Figure 3:
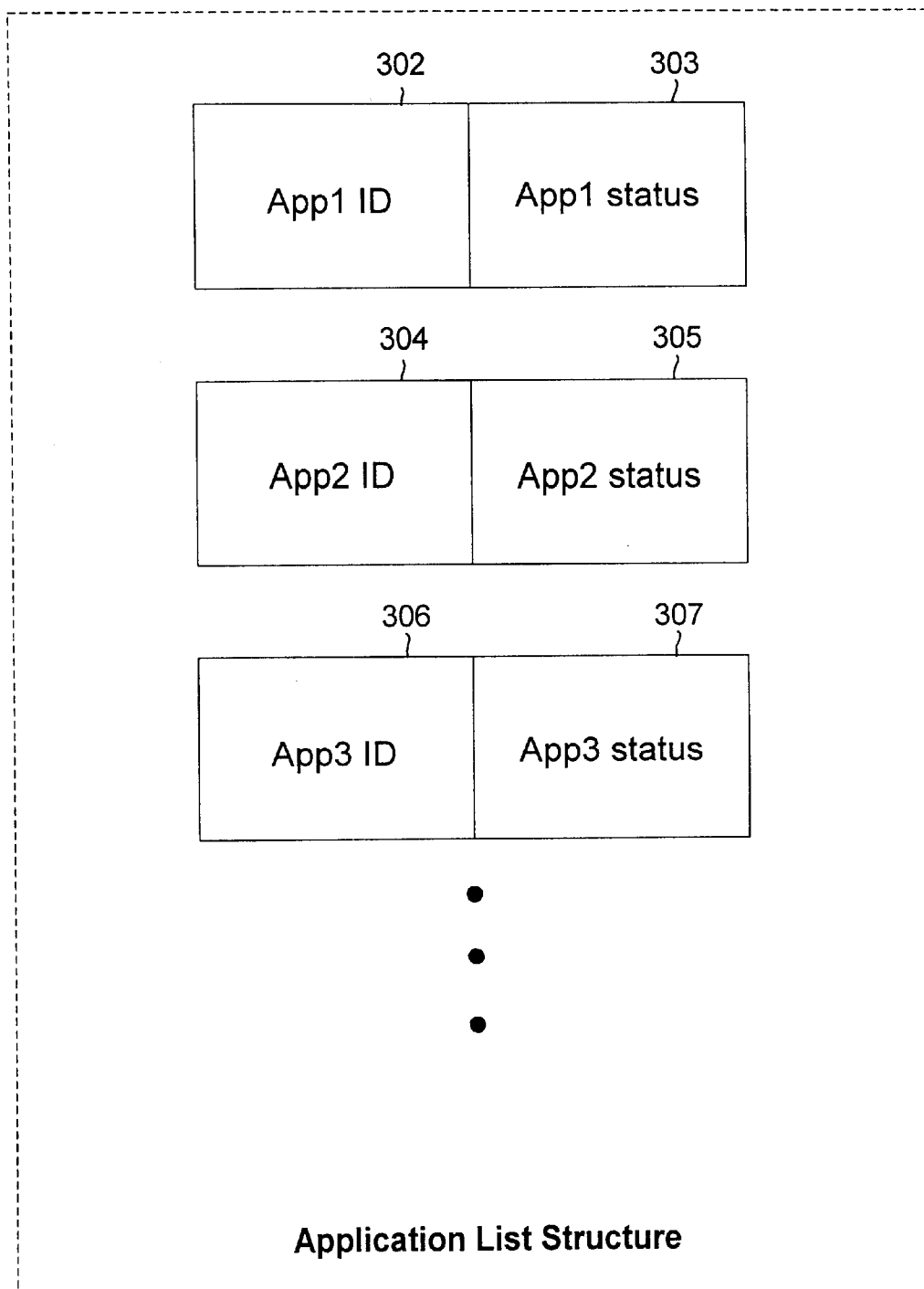
FIG. 3 is an example of an application list structure of the present invention.

FIG. 3 shows the structure of an application list 301.

Each item in the list contains two sets of information, the application identification information 302, 304, 306 and the application status information 303, 305, 307. The application identification information is used to identify the application. The application identification information may include application's ID, name, version, icon, etc. The application status information is used to record its up-to-date status. The application status information may include a flag indicating if this application is installed in the host handheld device, a flag indicating if this application is selected by the user to be distributed from the server at the next time the host device connects to the server, etc.

Figure 4:
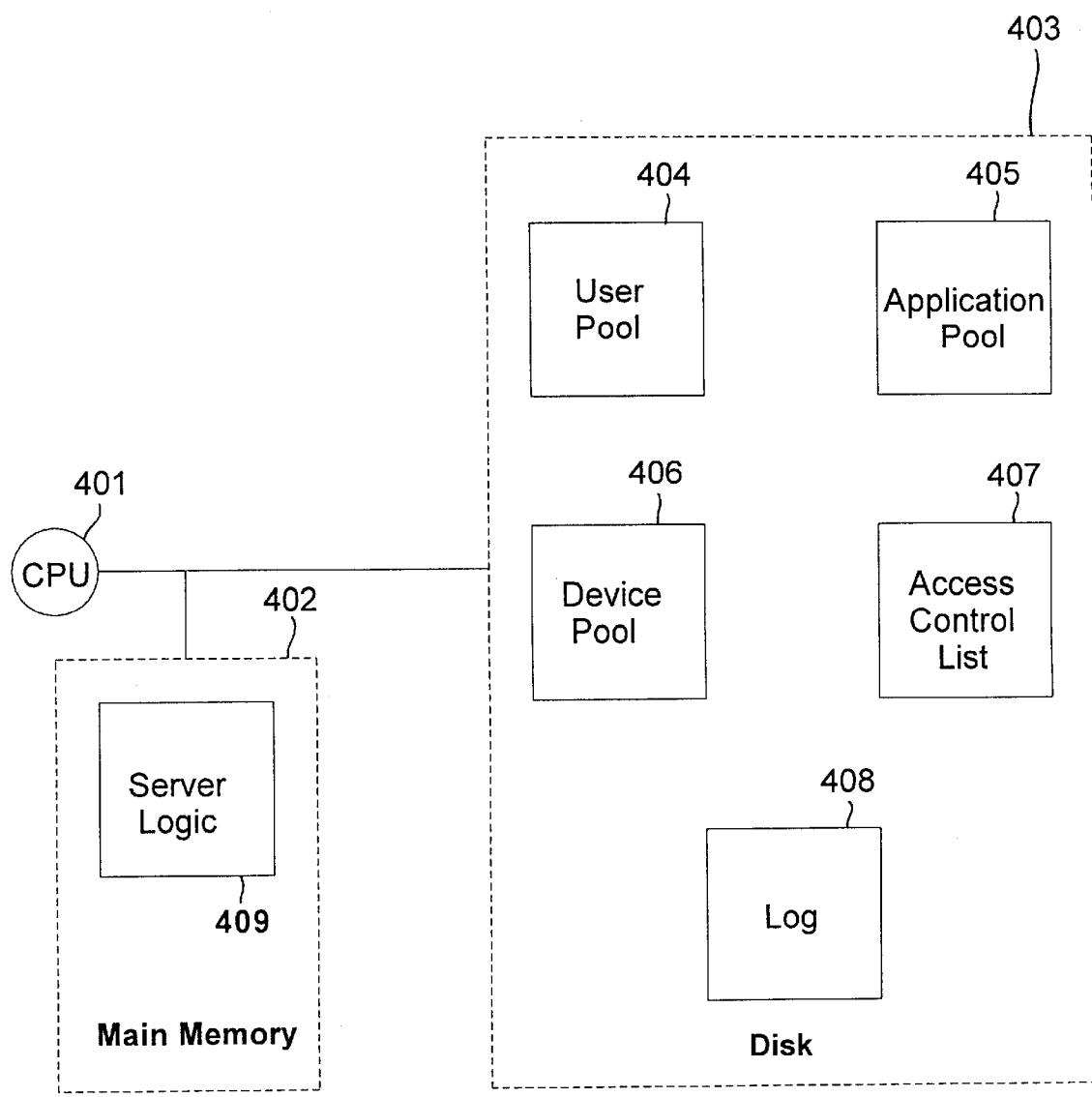
FIG. 4 is a diagram of an architecture of a server feature of the present invention.

FIG. 4 shows architecture of a server PC, workstation, mainframe, etc., of the present invention, which includes a CPU 401, main memory 402, such as RAM, and storage devices 403. The main memory 402 stores the server logic 409 of the present invention which is preferably embodied as computer executable code which may be loaded from storage devices 403 into the main memory 402. The storage devices 403 store the user pool 404, the application pool 405, the device pool 406, the access control list 407 for governing which user and which device may be allowed which application, and the log 408 to log the computer activities.

The user pool 404, the application pool 405, and the device pool 406 may be implemented as a tables in a relational database or other types of data structure in various information management systems, such as the Lotus Notes, which may provide storage for each type of information and its attributes. Such information management systems should preferably provide a retrieval and search functions.

Furthermore, to satisfy the aforementioned application management function in monitoring what applications have been installed in which devices, a preferred implementation of the server of the present invention may store and manage one application list for each device in the device pool that reflects the client application list in the corresponding device. The access control list 407 is a way to associate each application to a list of users and a list of devices that are authorized to download this application. An alternative implementation of the access control list, sometimes called the capability list, is to associate each user or device with a list of applications authorized for download for this user or device.

Figure 5:
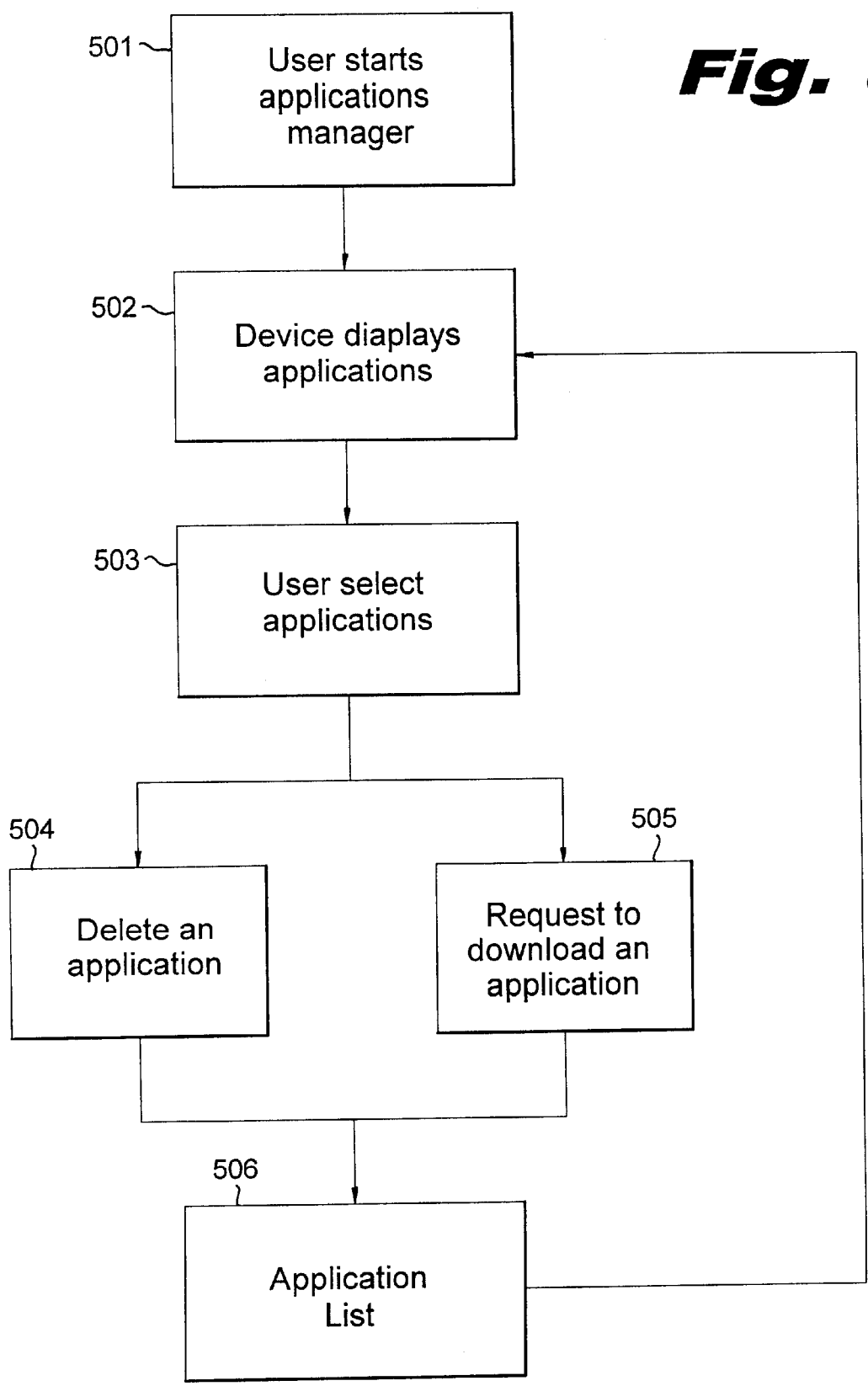
FIG. 5 is a flow diagram of the application list manager process of the present invention.

FIG. 5 shows the logic flow of the application list manager 205 (FIG. 2) in the client device, used to modify the application list 506. After the application manager is started in step 501, the list of applications 506 available for download from the server is displayed in step 502. In step 503, the user selects applications to either delete or to download. If the application was selected for deletion, at step 504 it is deleted from the client device if the application was installed there. If the application was selected for download, a request to download the next time the client synchronizes with the server is issued at step 505. At step 506, the status of all applications is updated accordingly and recorded in the application list 506, after which the program control returns to step 502.

Figure 6:
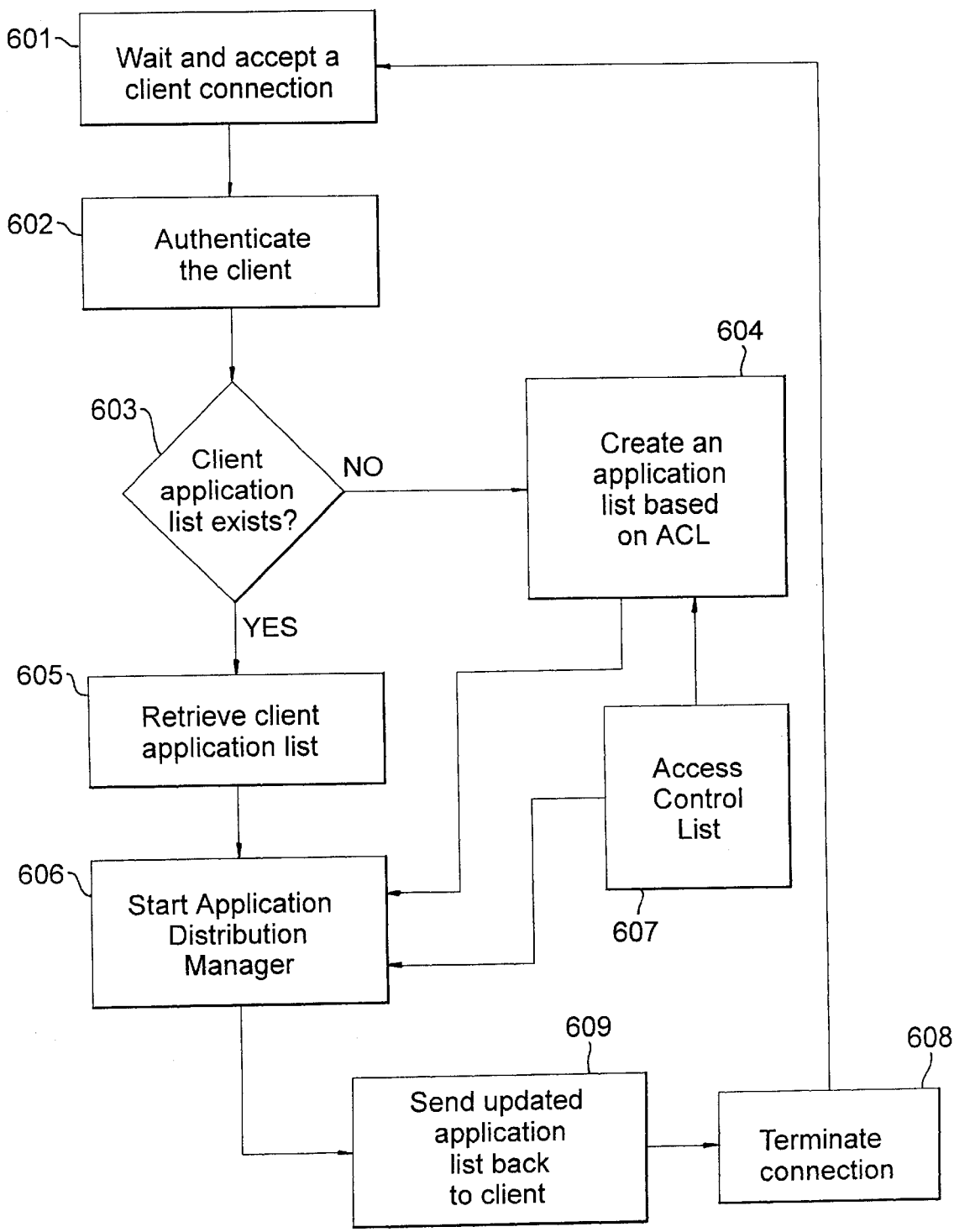
FIG. 6 is a flow diagram of the server logic of the present invention.

FIG. 6 shows logic flow of the server 409 (FIG. 4) executed by the server of the present invention in servicing a client request for application distribution or download 505 (FIG. 5). The server waits for and accepts a client request at step 601. If a client request is accepted, indicating that the client has successfully connected to the server, the server authenticates the client at step 602. The server may deploy techniques such as the encrypted password approach or the share secret public key approach among others to authenticate the client.

When the client is authenticated, in step 603, the server determines whether the client device has an application list. If the client has an application list, the server retrieves it in step 605. Alternatively, if the application list does not exist on the client device, in step 604, the server creates an application list of applications authorized to be distributed to a particular user and to a particular device based on the user ID, the device ID of the client and the access control list 607.

In both situations processing continues in step 606 where the application distribution manager process is started. The application distribution manager process:

a. compares the client application list with the access control list 607;

b. performs appropriate updates to the client application list, the log, and the application list associationed with the client device in the server; and c. may download to the client device, based on the access control list 607 and the management policies,
 1. a set of applications selected by the client,
 2. a default set of applications that the client device does not have, and
 3. a set of applications that are newer versions of the ones owned by the client.

After the application distribution manager completes its task, in step 609, the server sends the updated client application list back to the client to replace the original version, or a new application list if the client device did not have an application list. The connection is terminated in step 608 and the control passes to step 601 to where the server waits for next client request.

A server described above may be implemented using a multi-threaded approach. Each time the server accepts a client request, the server spawns off a thread to process this request while the original processing thread continues to waits for other client requests. When the processing of the newly spawned thread is complete, the server simply terminates this thread. In operating systems where multi-thread is not supported, as in some UNIX based systems, each individual thread may be replaced by a separate process.

Figure 7:
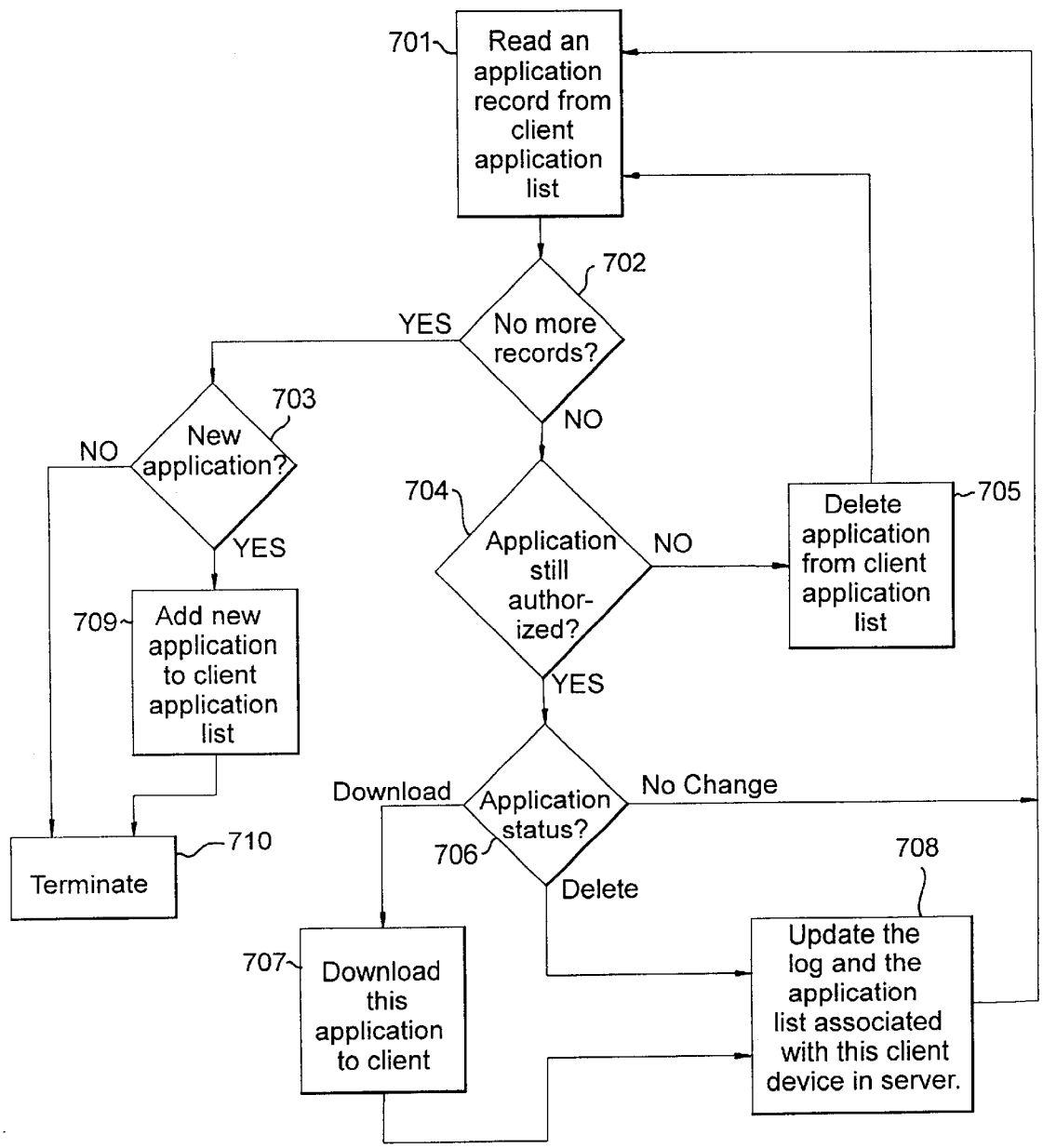
FIG. 7 is a flow diagram of the application distribution manager process of the present invention.

FIG. 7 shows one of the embodiments of the application distribution manager 606 (FIG. 6). In step 701 a record from the client application list is read. At step 702 a determination is made whether more records remain in the application list.

If no more records remain to be read, the server determines in step 703, using the access control list whether there are new applications to be added to this client's application list. If there are no new applications to be added the application distribution manager process is terminated in step 710. However, if there are new applications to be added, the server adds these new applications to the client application list in step 709, and then the application distribution manager process is terminated in step 710.

In the embodiment of the application distribution manager shown in FIG. 7, the process adds new applications to the application list in step 709 based on access control list 607 (FIG. 6). An alternative embodiment may examine each newly added application in the updated application list and download the applications that belong to a default set of applications for this client.

The server may be programmed to keep a list of times when each client last conducted application distribution request and when the access control list was last changed. If the access control list has not been changed since this client's last request, then the decision step 703 and a possible step 709 can be avoided and the application distribution manager process will be terminated in step 710.

If there are more records to be read, then for each record read from the client application list, the server determines in step 704, using the access control list whether the application in this record is still authorized for download to the client user and device. This is so because the access control policy may change from time to time and the application authorized for this client may loose the authorization and may have to be taken out from the client application list.

Therefore, if the application of the current record has become unauthorized by this client, the server then removes this application from the client application list in step 705 and will return to read the next record in step 701.

The server may be programmed to keep a list of times when this client last conducted application distribution request and when the access control list was last changed. If the access control list has not been changed since this client's last request, the step 704 can be avoided and the server proceeds from step 702 directly to step 706.

If the application in the current record read from the application list is still authorized, the server continues processing in step 706, where it determines whether the status of this application in the client application list is marked "download," "delete," or "no change."

The decision of the status "download," "delete," and "no change" can be based on the new access control list 607 (FIG. 6) or management policies. For example, a server may download an application to a client device if this application is found in a default set of applications required by this client which does not already have it, or this application is a new version of an older application existing in the client device, or it is selected by the client for download which is allowed by the access control list 607 (FIG. 6).

If the status is marked "no change," nothing further needs to be done for this application, therefore the processing will continue at step 701, where the next record is read.

If the status is marked "download," in step 707, this application is either a. downloaded from the server to the client device, or
  b. mark this application to be download later and after all the records in the client application list are read and all applications are marked for download, the server can download all marked applications to the client device before disconnecting.

In step 708 the server version of the application list associated with this client device and the logs are updated to reflect the current status and the processing continues at step 701, where the next record is read.

If the status is marked "delete," this application is deleted from the client device. In step 708 the server version of the application list associated with this client device and the logs are updated to reflect the current status and the processing continues at step 701, where the next record is read.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for distributing applications and databases from at least one server entity to at least one client entity, said client entity characterized as being intermittently connected to said server entity, said method comprising the steps of:
   a. selecting said applications and databases in an application list by changing a respective status of said applications and databases in said application list to indicate that said selected applications are to be downloaded and deleted;
   b. communicating said application list from said client entity to said server entity when a connection of said client entity to said server entity is established, said application list including status information of said applications and databases for said client entity;
   c. providing an access control list at said server entity for updating and maintaining associations of said applications and databases for said client entity;
   d. synchronizing said application list and said access control list by determining which applications and databases are both selected by said client entity and are authorized for use by said server entity; and
   e. distributing said selected and authorized applications and databases based on said synchronizing from said server entity to said client entity.

2. The method of claim 1, wherein said application list comprises records including information about said applications and databases, each record containing application identification information, and an application status information.

3. The method of claim 2, further providing an application list for said client entity, said application list comprising applications managed by said server entity and authorized for said client entity.

4. The method of claims 3, further comprising steps of creating said application list using said access control list.

5. The method of claim 4, further comprising steps of updating said application list.

6. The method of claim 5, wherein step (a) is performed on said client entity and said application list is maintained on said client entity.

7. The method of claim 5, wherein step (a) is performed on said server entity and said application list is maintained on said server entity.

8. The method of claim 6, further comprising steps of communicating said created application list, said updated application list, said selected applications and databases and newer versions of said selected applications and databases to said client entity, said newer versions of said selected applications and databases overriding older versions of said selected applications and databases present on said client entity.

9. A system for distributing applications and databases from at least one server entity to at least one client entity, said client entity characterized as being intermittently connected to said server entity, said system comprising:
   a. means for selecting said applications and databases in an application list by changing a respective status of said applications and databases in said application list to indicate that said selected applications are to be downloaded and deleted;
   b. means for communicating said application list from said client entity to said server entity when a connection of said client entity to said server entity is established, said application list including status information of said applications and databases for said client entity;

c. means for providing an access control list at said server entity for updating and maintaining associations of said applications and databases for said client entity; and d. means for synchronizing said application list and said access control list by determining which applications and databases are both selected by said client entity and are authorized for use by said server entity; and e. means for distributing said selected and authorized applications and databases based on said synchronizing from said server entity to said client entity.

10. The means of claim 9, wherein said application list comprises records including information about said applications and databases, each record containing application identification information, and an application status information.

11. The means of claim 10, wherein step (a) is performed on said client entity and said application list is maintained on said client entity.

12. The means of claim 10, wherein step (a) is performed on said server entity and said application list is maintained on said server entity.

13. A computer program device readable by a machine, tangibly embodying a program of instructions executable by a machine to perform method steps for distributing applications and databases from at least one server entity to at least one client entity, said client entity characterized as being intermittently connected to said server entity, said method comprising the steps of:

a. selecting said applications and databases in an application list by changing a respective status of said applications and databases in said application list to indicate that said selected applications are to be downloaded and deleted;

b. communicating said application list from said client entity to said server entity when a connection of said client entity to said server entity is established, said application list including status information of said applications and databases for said client entity;

c. providing an access control list at said server entity for updating and maintaining associations of said applications and databases for said client entity; and d. synchronizing said application list and said access control list by determining which applications and databases are both selected by said client entity and are authorized for use by said server entity; and e. distributing said selected and authorized applications and databases based on said synchronizing from said server entity to said client entity.

14. The method of claim 13, wherein said application list comprises records including information about said applications and databases, each record containing application identification information, and an application status information.

15. The method of claim 14, further providing an application list for said client entity, said application list comprising applications managed by said server entity and authorized for said client entity.

16. The method of claim 15, further comprising steps of creating said application list using said access control list.

17. The method of claim 16, further comprising steps of updating said application list.

18. The method of claim 17, wherein step (a) is performed on said client entity and said application list is maintained on said client entity.

19. The method of claim 17, wherein step (a) is performed on said server entity and said application list is maintained on said server entity.

20. The method of claim 18, further comprising steps of communicating said created application list, said updated application list, said selected applications and databases and newer versions of said selected applications and databases to said client entity, said newer versions of said selected applications and databases overriding older versions of said selected applications and databases present on said client entity.

* * * * *

UNITED STATES PATENT AND TRADEMARK OFFICE
CERTIFICATE OF CORRECTION

PATENT NO. : 6,553,375 B1
DATED : April 22, 2003
INVENTOR(S) : Yun-Wu Huang et al.

It is certified that error appears in the above-identified patent and that said Letters Patent is hereby corrected as shown below:

Title page,
Item [56], References Cited, FOREIGN PATENT DOCUMENTS,
"9-260924" should read -- 9-269924 --
Item [57], ABSTRACT,
Lines 6-7, "After established a connection" should read -- After a connection is established --

Signed and Sealed this

Ninth Day of March, 2004

JON W. DUDAS
*Acting Director of the United States Patent and Trademark Office*